United States Patent

[11] 3,543,892

| [72] | Inventor | Arnold A. De Baillie<br>Evansville, Indiana |
|---|---|---|
| [21] | Appl. No. | 712,244 |
| [22] | Filed | March 11, 1968 |
| [45] | Patented | Dec. 1, 1970 |
| [73] | Assignee | Kearney-National Inc.<br>a corporation of Delaware. by mesne assignment |

[54] COMBINATION BELT IDLER, CLUTCH AND BRAKE FOR POWER LAWNMOWER
2 Claims, 3 Drawing Figs.

| [52] | U.S. Cl. | 192/11;<br>56/25.4 |
|---|---|---|
| [51] | Int. Cl. | F16h 57/10 |
| [50] | Field of Search | 192/11 |

[56] References Cited
UNITED STATES PATENTS

| 247,075 | 9/1881 | Larzelere | 192/11 |
|---|---|---|---|
| 307,839 | 11/1884 | Brey | 192/11 |
| 820,102 | 10/1905 | Duer | 192/11 |
| 2,306,755 | 12/1942 | Ronning | 192/11 |
| 2,957,561 | 10/1960 | Musgrave | 192/11 |
| 3,339,662 | 9/1967 | Hanson et al. | 192/11X |
| 3,367,459 | 2/1968 | Rubin | 192/11 |

*Primary Examiner*—Benjamin W. Wyche, III
*Attorney*—Warren D. Flackbert

ABSTRACT: An arrangement for a power rotary lawnmower utilizing a belt to transmit power to the cutting blade characterized by a single mechanical device to serve idler, clutch and brake functions instead of a separate mechanical device for each function.

Patented Dec. 1, 1970

3,543,892

INVENTOR.
ARNOLD A. DeBAILLIE
BY
ATTORNEY

COMBINATION BELT IDLER, CLUTCH AND BRAKE FOR POWER LAWNMOWER

As is known, the use of a belt drive for the cutting blade of a power mower serves as an engine protection feature, as, for example, when the cutting blade hits a solid object, the impact is not transmitted directly to the engine of the mower, but, instead, is absorbed through belt slippage. The use of a rotary power mower having such drive belt requires idler, clutch and brake functions.

The invention affords an important advantage by combining the aforesaid idler, brake and clutch functions into a single mechanical control lever, instead of a separate mechanical component for each function. Briefly, the control lever, which is pivotal and positioned proximate the drive pulley for the cutting blade, has a braking surface which bears against the drive belt in a braking position. When a handle control is released, spring means cause belt engagement and proper belt tension for driving the cutting blade.

The preceding is important as a safety feature, in that the cutting blade is engaged for action after the operator is safely at the handle control behind the handles. The operator can also stop the cutting blade from such safe position behind the handles without stopping the engine, the latter being desirable, for example, in changing a grass bag, or for passing over sidewalks, driveways or any areas where the rotating cutting blade would create hazardous conditions.

A better understanding of the present invention will become more apparent with the following description, taken in conjunction with the accompanying drawing, wherein.

Figure 1:
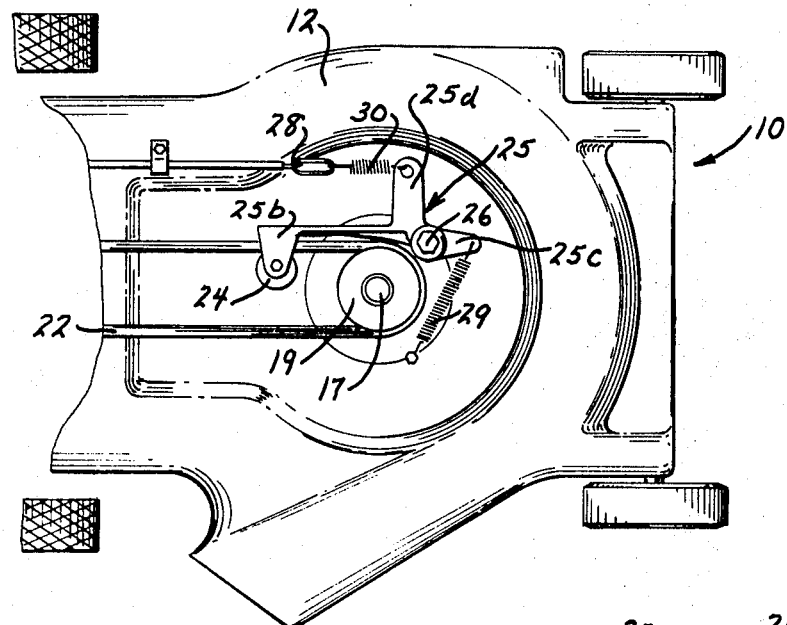
FIG. 1 is a top plan view, partly fragmentary, showing the invention installed on a conventional rotary power mower.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to the figures, the invention is described in connection with a conventional rotary power lawnmower 10, the latter being only partially shown for purposes of clarity of presentation. Typically, the mower 10 is defined by a wheel-supported housing 12 beneath which a cutting blade 14 is disposed. The cutting blade 14 is supported on a rotatable shaft 17 extending through a hub 15 mounted on the aforesaid housing 12, where a driven pulley 19 is secured to the upper end of the shaft 17. A drive belt 22 passes around the driven pulley 19 and also extends around a drive pulley (not shown) of a conventional power source for the mower.

Figure 3:
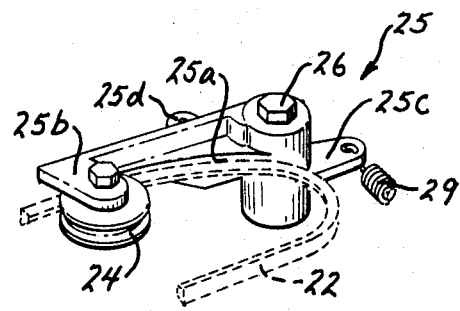
FIG. 3 is a perspective view of the control lever, with the drive belt shown in phantom for purposes of clarity and understanding.
Figure 2:
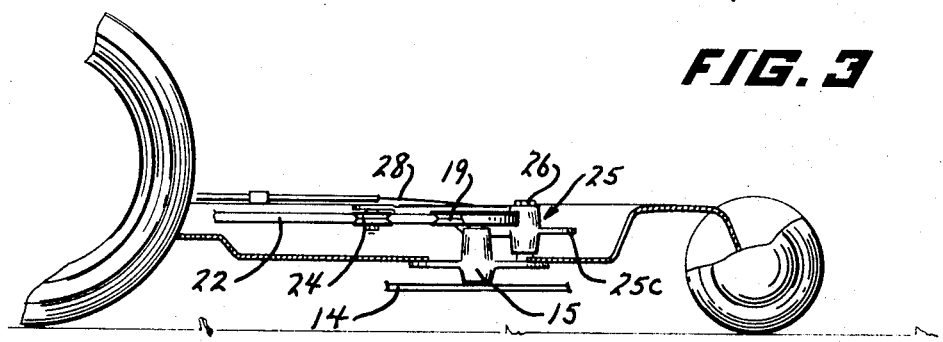
FIG. 2 is a view in elevation, partly fragmentary and partly in vertical section, showing further details of the invention.

In any event, a control lever 25 which principally defines the invention is mounted on the top surface of the housing 12 for pivotal movement at 26. As should be particularly apparent from FIG. 3, the control lever 25 has a curved belt engaging surface 25a which serves to achieve braking action, to be discussed below.

One end 25b of the control lever 25 receives a rotatable idler pulley 24, where the control lever 25 also has projecting portions 25c and 25d. The projecting portion 25c receives one end of a spring 29, the other end being affixed to the housing 12. As will be described herebelow, the spring 29 serves to urge the control lever 25 in a clockwise direction in FIG. 1, upon release of a handle control (not shown).

Such handle control operates a control cable 28, where a spring 30 extends between a loop at the end of such control cable 28 and the projecting portion 25d on the control lever 25. The spring 30 serves to urge the control lever 25 in a counterclockwise direction in FIG. 1, insuring uniform pressure during braking action.

In use, when the handle control behind the handles of the mower has been released by the operator from its normal braking position, spring 29 rotates the control lever 25 clockwise from the position of FIG. 1, i.e. to effect rotation of the cutting blade 14 through rotation of driven pulley 19. In other words, the spring 29 causes tensioning of the drive belt 22 to effect driving action between the drive pulley and the driven pulley 19 and the proper belt tension through idler pulley 24.

When the handle control is returned to its normal position, braking action is accomplished, i.e. the control cable 28 and the spring 30 overcome the spring 29, moving the control lever in a counterclockwise direction to the position of FIG. 1. When the latter occurs, the braking surface 25a of the control lever 25 engages the drive belt 22 and stops rotation of the driven pulley 19 and, hence, the cutting blade 14. The drive belt 22 is then in a relatively loose condition, meaning that the power source can continue to operate, but with the cutting blade 14 not rotating.

It should be understood that the driver belt 22 serves multipurposes, i.e. is used as a friction material for clutching action and braking action as well. Such is in contrast to the use of a separate brake lining and a separate clutch lining.

The invention importantly combines the aforesaid functions of clutching, braking, and idling into one mechanical unit. The described structure is susceptible to various changes within the spirit of the invention. For example, the control lever may be varied dimensionwise and in plan configuration. Thus, the above description should be considered illustrative, and not as limiting the scope of the following claims:

I claim:

1. In a power lawnmower having a housing, a driven pulley for a cutting blade mounted on said housing, and a drive belt extending around said driven pulley, a control lever pivotally mounted on said housing, an idler pulley mounted on said control lever and selectively engaging said drive belt, said control lever having a braking surface also selectively engaging said drive belt, means pivoting said control lever into a normal braking position with respect to said drive belt and to said driven pulley and releasing said control lever from said normal braking position to another position tensioning said drive belt for rotation of said driven pulley, said idler pulley engaging said drive belt at said tensioning position, and spring means connecting said control lever and said housing biasing said control lever in said tensioning position upon release of said control lever from said normal braking position.

2. The structure of claim 1 where spring means connecting said control lever and said means bias said control lever in said normal braking position.